US007643400B1

(12) United States Patent
Iazikov et al.

(10) Patent No.: US 7,643,400 B1
(45) Date of Patent: Jan. 5, 2010

(54) OPTICAL ENCODING OF DATA WITH DISTRIBUTED DIFFRACTIVE STRUCTURES

(75) Inventors: Dmitri Iazikov, Springfield, OR (US); Christoph M. Greiner, Eugene, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 825 days.

(21) Appl. No.: 11/277,423

(22) Filed: Mar. 24, 2006

Related U.S. Application Data

(60) Provisional application No. 60/665,635, filed on Mar. 24, 2005.

(51) Int. Cl.
*G11B 7/00* (2006.01)
*G11B 7/24* (2006.01)

(52) U.S. Cl. ............ 369/275.4; 369/275.1; 369/109.01; 369/112.03

(58) Field of Classification Search ........................ None
See application file for complete search history.

(56) References Cited

U.S. PATENT DOCUMENTS

| | | | |
|---|---|---|---|
| 3,995,937 | A | 12/1976 | Baues et al. |
| 4,006,967 | A | 2/1977 | Kenan et al. |
| 4,140,362 | A | 2/1979 | Tien |
| 4,387,955 | A | 6/1983 | Ludman et al. |
| 4,440,468 | A | 4/1984 | Auracher et al. |
| 4,660,934 | A | 4/1987 | Akiba et al. |
| 4,740,951 | A | 4/1988 | Lizet et al. |
| 4,743,083 | A | 5/1988 | Schimpe |
| 4,746,186 | A | 5/1988 | Nicia |
| 4,773,063 | A | 9/1988 | Hunsperger et al. |
| 4,786,133 | A | 11/1988 | Gidon et al. |
| 4,803,696 | A | 2/1989 | Pepper et al. |
| 4,824,193 | A | 4/1989 | Maeda et al. |

(Continued)

FOREIGN PATENT DOCUMENTS

EP        0 310 438 A1        4/1989

(Continued)

OTHER PUBLICATIONS

Hirayama et al, Applied Physics Letters, vol. 69 No. 6 p. 791 (Aug. 5, 1996).

(Continued)

*Primary Examiner*—Muhammad N. Edun
(74) *Attorney, Agent, or Firm*—David S. Alavi (57) ABSTRACT

An optical data storage medium comprises an optical medium with multiple data marks. Each data mark is arranged for modifying a portion of an optical reading beam incident thereon. At least one of the data marks is a delocalized data mark comprising a set of multiple diffractive elements collectively arranged for modifying a portion of the optical reading beam incident thereon. A method for recording data on an optical data storage medium comprises forming on or in the optical medium multiple data marks encoding the recorded data, including the at least one delocalized data mark. A method for reading an optical data storage medium comprises: successively illuminating with the optical reading beam the multiple data marks; sensing variations among the respective portions of the optical reading beam modified by the multiple data marks; and decoding from the sensed variations data encoded by the multiple data marks.

33 Claims, 4 Drawing Sheets

U.S. PATENT DOCUMENTS

| | | | |
|---|---|---|---|
| 4,834,474 | A | 5/1989 | George et al. |
| 4,846,552 | A | 7/1989 | Veldkamp et al. |
| 4,852,960 | A | 8/1989 | Alferness et al. |
| 4,923,271 | A | 5/1990 | Henry et al. |
| 4,938,553 | A | 7/1990 | Maerz et al. |
| 5,040,864 | A | 8/1991 | Hong |
| 5,107,359 | A | 4/1992 | Ohuchida |
| 5,165,104 | A | 11/1992 | Weverka |
| 5,195,161 | A | 3/1993 | Adar et al. |
| 5,357,591 | A | 10/1994 | Jiang et al. |
| 5,450,511 | A | 9/1995 | Dragone |
| 5,768,450 | A | 6/1998 | Bhagavatula |
| 5,812,318 | A | 9/1998 | Babbitt et al. |
| 5,830,622 | A | 11/1998 | Canning et al. |
| 6,011,884 | A | 1/2000 | Dueck et al. |
| 6,011,885 | A | 1/2000 | Dempewolf et al. |
| 6,137,933 | A | 10/2000 | Hunter et al. |
| 6,144,480 | A | 11/2000 | Li et al. |
| 6,169,613 | B1 | 1/2001 | Amitai et al. |
| 6,169,614 | B1 | 1/2001 | Whitcomb et al. |
| 6,285,813 | B1 | 9/2001 | Schultz et al. |
| 6,323,970 | B1 | 11/2001 | Popovich |
| 6,473,232 | B2 | 10/2002 | Ogawa |
| 6,553,162 | B1 | 4/2003 | Okayama |
| 6,678,429 | B2 | 1/2004 | Mossberg et al. |
| 6,702,897 | B2 | 3/2004 | Cullen et al. |
| 6,768,834 | B1 | 7/2004 | Gruhlke |
| 6,823,115 | B2 | 11/2004 | Greiner et al. |
| 6,829,417 | B2 | 12/2004 | Greiner et al. |
| 6,859,318 | B1 | 2/2005 | Mossberg |
| 6,879,441 | B1 | 4/2005 | Mossberg |
| 6,961,491 | B2 | 11/2005 | Greiner et al. |
| 6,965,464 | B2 | 11/2005 | Mossberg |
| 6,965,716 | B2 | 11/2005 | Greiner et al. |
| 6,985,656 | B2 | 1/2006 | Iazikov et al. |
| 6,987,911 | B2 | 1/2006 | Mossberg et al. |
| 6,990,276 | B2 | 1/2006 | Brice et al. |
| 6,993,223 | B2 | 1/2006 | Greiner et al. |
| 7,009,743 | B2 | 3/2006 | Mossberg |
| 7,016,569 | B2 | 3/2006 | Mule et al. |
| 7,054,517 | B2 | 5/2006 | Mossberg et al. |
| 7,062,128 | B2 | 6/2006 | Mossberg |
| 2003/0011833 | A1 | 1/2003 | Yankov et al. |
| 2003/0039444 | A1 | 2/2003 | Mossberg et al. |
| 2003/0117677 | A1 | 6/2003 | Mossberg |
| 2004/0076374 | A1 | 4/2004 | Greiner et al. |
| 2004/0131360 | A1 | 7/2004 | Iazikov et al. |
| 2004/0170356 | A1 | 9/2004 | Iazikov et al. |
| 2004/0179779 | A1 | 9/2004 | Greiner et al. |
| 2004/0208466 | A1 | 10/2004 | Mossberg et al. |
| 2004/0258356 | A1 | 12/2004 | Brice et al. |
| 2005/0018951 | A1 | 1/2005 | Mossberg et al. |
| 2005/0078912 | A1 | 4/2005 | Iazikov et al. |
| 2005/0135744 | A1 | 6/2005 | Greiner et al. |
| 2005/0135745 | A1 | 6/2005 | Greiner et al. |
| 2005/0135747 | A1 | 6/2005 | Greiner et al. |
| 2005/0152011 | A1 | 7/2005 | Mossberg |
| 2005/0163425 | A1 | 7/2005 | Greiner et al. |
| 2006/0023280 | A1 | 2/2006 | Mossberg |
| 2006/0139712 | A1 | 6/2006 | Mossberg |

FOREIGN PATENT DOCUMENTS

| | | |
|---|---|---|
| GB | 2 168 215 A | 6/1986 |
| WO | WO-99/35523 A1 | 7/1999 |
| WO | WO-99/56159 A1 | 11/1999 |
| WO | WO 02-075411 | 9/2002 |

OTHER PUBLICATIONS

Lohmann et al, Applied Optics, vol. 34 No. 17 p. 3172 (Jun. 10, 1995).
Bedford et al, IEEE Photonics Technology Letters, vol. 12 No. 8 p. 948 (Aug. 2000).
Kristjansson etal, IEEE Photonics Technology Letters, vol. 12 No. 10 p. 1319 (Oct. 2000).
Modh et al, IEEE J. Quantum Electronics, vol. 37 No. 6 p. 752 (Jun. 2001).
Eriksson et al, IEEE J. Quantum Electronics, vol. 34 No. 5 p. 858 (May 1998).
Kazarinov et al, IEEE J. Quantum Electronics, vol. QE-23 No. 9 p. 1419 (Sep. 1987).
Eriksson et al, IEEE Photonics Technology Letters, vol. 9 No. 12 p. 1570 (Dec. 1997).
Capron et al, J. Lightwave Tech., vol. 11 No. 12 pp. 2009-2014 (Dec. 1993).
Deri et al, IEEE Photonics Tech. Lett., vol. 6 No. 2 pp. 242-244 (Feb. 1994).
Grunnet-Jepsen et al, Electon. Lett., vol. 35 No. 13 pp. 1096-1097 (Jun. 1999).
Paddon et al, Opt. Lett., vol. 23 No. 19 pp. 1529-1531 (1998).
Madsen et al, IEEE J. Sel. Top. Quant. Elec., vol. 4 No. 6 pp. 925-929 (Nov./Dec. 1998).
Gini et al, J. Lightwave Tech., vol. 16 No. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., vol. 7 No. 3 pp. 324-326 (Mar. 1995).
Takenouchi et al, Optics Express, vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron. Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl. Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron. Lett., vol. 29 No. 9 p. 805 (Apr. 1993).
Li, Opt. Commum., vol. 114 pp. 406-412 (1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).
Cowin et al Electron. Lett., vol. 35 No. 13 pp. 1074-1076 (Jun. 1999).
Canning et al, Opt. Commun., vol. 171 pp. 213-217 (1999).
Tien et al, Use of concentric-arc grating as a thin-film spectrograph for guided waves, Am. Inst. of Physics (1980) pp. 524-525.
Kaneko et al, IEEE J. Sel. Top. Quant. Elec., vol. 5 No. 5 pp. 1227-1236 (Sep./Oct. 1999).
Sun et al, IEEE Photonics Tech. Lett., vol. 10 No. 1 pp. 90-92 (Jan. 1998).
McGreer, IEEE Photonics Tech. Lett., vol. 8 No. 4 pp. 551-553 (Apr. 1996).
Avrutsky et al, IEEE Photonics Tech. Lett., vol. 10 No. 6 pp. 839-841 (Jun. 1998).
Alavie et al, IEEE Photonics Tech. Lett., vol. 5 No. 9 pp. 1112-1114 (Sep. 1993).
Fu et al, Opt. Lett., vol. 22 No. 21 pp. 1627-1629 (1997).
Wang et al, IEEE Photonics Tech. Lett., vol. 3 No. 1 pp. 36-38 (Jan. 1991).
Wang et al Opt. Lett., vol. 15 No. 7 pp. 363-365 (Apr. 1990).
Wu et al, J. Lightwave Tech., vol. 10 No. 11 pp. 1575-1589 (Nov. 1992).

Eldada et al, IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characateristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiesman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995).

Mossberg, Opt. Lett., vol. 26 No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

OPTICAL ENCODING OF DATA WITH DISTRIBUTED DIFFRACTIVE STRUCTURES

BENEFIT CLAIMS TO RELATED APPLICATIONS

This application claims benefit of U.S. provisional App. No. 60/665,635 filed Mar. 24, 2005, said provisional application being hereby incorporated by reference as if fully set forth herein.

BACKGROUND

The field of the present disclosure relates to optical encoding of data. In particular, distributed diffractive structures (i.e. sets of diffractive elements) are formed in or on an optical medium for encoding the data.

Optical recording media in the form of compact disks (CDs), digital versatile discs or digital video discs (DVDs), and more advanced format optical discs play an important role in the distribution of software, data, music, video, or other content. Such discs typically include a data layer wherein localized micron- or sub-micron-scale marks (typically recessed pits, raised bumps, index or density variations, or other suitable marks) are optically or mechanically written, which is overlaid with a substantially transparent protective layer. Upon readout, a reading laser beam is typically focused through the transparent layer to a spot of a size similar to the size of the data marks when it reaches the data layer, and a portion of the reading beam is redirected by the data mark (usually back-reflected). Upon entering the transparent protective layer, the reading laser spot size is typically substantially larger, i.e. many times the size of data marks of the data layer (tens or hundreds of microns or more). The larger size of the reading laser spot as it enters the transparent protective layer reduces the effect of dust, scratches, nicks, or other imperfections or irregularities on the exterior surface of the disc. The light back-reflected from the data layer is detected and monitored for variations as the disk spins and the focused reading laser spot sweeps across the data marks and areas of the disc between the data marks. Variations in the detected, back-reflected optical signal arise from differences between the back-reflected reading laser beam reflected from the data marks and from areas between the data marks. Such differences may be differences of back-reflected power or intensity, back-reflected beam size or geometry, or other selected property of the back-reflected beam.

Figure 1:
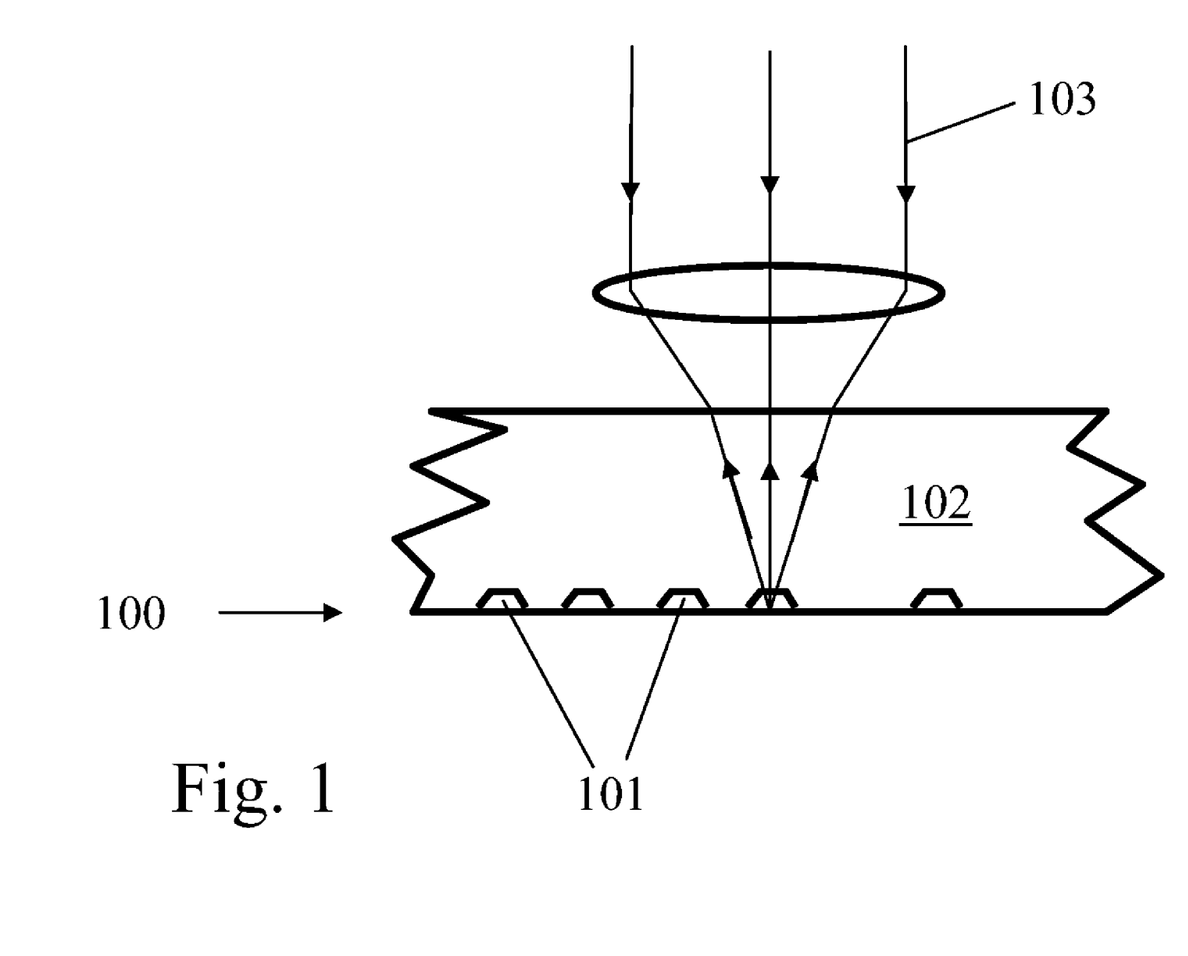
FIG. 1 is a schematic side view of data marks on an optical data storage medium.

An exemplary geometry of a single data layer 100 and its protective transparent overcoat layer 102 are shown in FIG. 1. The optical disk may be multi-sided or have a more complex configuration, but for convenience of exposition only, only a single data layer and its protective transparent coating are described. The methods and devices disclosed herein may be implemented to single-layer or multi-layer or other advanced format optical discs provided they have surficial or interfacial regions surrounding the data layer through which read lasers may be transmitted. A data layer may also be protected or overcoated on the back (i.e. from the non-read side) although such details are not of particular significance for the present disclosure. Localized data marks 101 may be produced as a part of a molding or stamping process used to make the disc, by spot-based laser writing, or other means. The localized data marks 101 may typically comprise indentations of some depth into the non-read side of transparent layer, which therefore appear as bumps from the read side of the disc. The data marks thus formed on the non-read side of the transparent layer may be overcoated on the non-read side with a high or partial reflective material. A reading-laser beam 103 is shown focused onto one of the data marks 101. Any other suitable arrangements or adaptations of the data marks, data layer, or transparent protective layer may be employed while implementing the structures, methods, arrangements, or adaptations disclosed or claimed herein. The particular detailed nature of typically-employed data marks does not limit application of the methods and devices disclosed or claimed herein.

The data marks 101 are shown as bumps (from the read side) in FIG. 1. A copy of the disc can be made via optical writing where a sufficiently powerful laser beam is used to make optical marks on the data layer of a suitably sensitized blank disc. Commercial content from stamped, molded, or otherwise produced disc may typically be reproduced via a suitable focused-spot laser writer. The present disclosure describes distributed (i.e. non-localized) encoding of data on an optical disc by means that may be difficult to reproduce via a focused-spot laser writer. Data encoded as described in the present disclosure may be introduced in the same production process that produces standard localized data marks on the data layer or by alternate means such as secondary stamping, embossing, printing, e-beam writing, laser pattern generation, and so forth.

Various embodiments, implementations, and adaptations of optical waveguides, diffractive element sets, or distributed diffractive structures are disclosed in:

Application Ser. No. 11/376,714 filed Mar. 14, 2006 in the names of Thomas W. Mossberg, Dmitri Iazikov, and Christoph M. Greiner (now U.S. Pat. No. 7,349,599);

Application Ser. No. 11/371,339 filed Mar. 7, 2006 in the names of Dmitri Iazikov, Christoph M. Greiner, and Thomas W. Mossberg (now U.S. Pat. No. 7,327,908 issued Feb. 5, 2008);

Application Ser. No. 11/361,407 filed Feb. 23, 2006 in the name of Thomas W. Mossberg (now U.S. Pat. No. 7,116,453 issued Oct. 3, 2006);

Application Ser. No. 11/334,039 filed Jan. 17, 2006 in the names of Thomas W. Mossberg, Christoph M. Greiner, and Dmitri Iazikov;

Application Ser. No. 11/298,290 filed Dec. 9, 2005 in the names of Thomas W. Mossberg, Dmitri Iazikov, and Christoph M. Greiner (now U.S. Pat. No. 7,330,614 issued Feb. 12, 2008);

Application Ser. No. 11/280,876 filed Nov. 15, 2005 in the names of Christoph M. Greiner, Dmitri Iazikov, and Thomas W. Mossberg;

Application Ser. No. 11/239,540 filed Sep. 28, 2005 in the name of Thomas W. Mossberg (now U.S. Pat. No. 7,009,743 issued Mar. 7, 2006);

Application Ser. No. 11/213,345 filed Aug. 25, 2005 in the names of Christoph M. Greiner, Dmitri Iazikov, and Thomas W. Mossberg (now U.S. Pat. No. 7,120,334 issued Oct. 10, 2006);

Application Ser. No. 11/210,439 filed Aug. 23, 2005 in the names of Dmitri Iazikov, Christoph M. Greiner, and Thomas W. Mossberg (now U.S. Pat. No. 7,359,597 issued Apr. 15, 2008);

Application Ser. No. 11/155,327 filed Jun. 16, 2005 in the names of Christoph M. Greiner, Thomas W. Mossberg, and Dmitri Iazikov (now U.S. Pat. No. 7,190,858 issued Mar. 13, 2007);

Application Ser. No. 11/076,251 filed Mar. 8, 2005 in the name of Thomas W. Mossberg (now U.S. Pat. No. 7,062,128 issued Jun. 13, 2006);

Application Ser. No. 11/062,109 filed Feb. 17, 2005 in the names of Christoph M. Greiner, Thomas W. Mossberg, and Dmitri Iazikov (now U.S. Pat. No. 7,181,103 issued Feb. 20, 2007);

Application Ser. No. 11/055,559 filed Feb. 9, 2005 in the names of Christoph M. Greiner, Thomas W. Mossberg, and Dmitri Iazikov (now U.S. Pat. No. 7,123,794 issued Oct. 17, 2006);

Application Ser. No. 11/021,549 filed Dec. 23, 2004 in the names of Dmitri Iazikov, Christoph M. Greiner, and Thomas W. Mossberg (now U.S. Pat. No. 7,260,290 issued Aug. 21, 2007);

Application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006);

Application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005);

Application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005);

Application Ser. No. 10/923,455 filed Aug. 21, 2004 in the names of Thomas W. Mossberg, Dmitri Iazikov, and Christoph M. Greiner (now U.S. Pat. No. 7,054,517 issued May 30, 2006);

Application Ser. No. 10/898,527 filed Jul. 22, 2004 in the named of Dmitri Iazikov, Christoph M. Greiner, and Thomas W. Mossberg (now U.S. Pat. No. 7,194,164 issued Mar. 20, 2007);

Application Ser. No. 10/857,987 filed May 29, 2004 in the names of Lawrence D. Brice, Christoph M. Greiner, Thomas W. Mossberg, and Dmitri Iazikov (now U.S. Pat. No. 6,990,276 issued Jan. 24, 2006);

Application Ser. No. 10/842,790 filed May 11, 2004 in the names of Thomas W. Mossberg, Christoph M. Greiner, and Dmitri Iazikov (now U.S. Pat. No. 6,987,911 issued Jan. 17, 2006);

Application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004);

Application Ser. No. 10/794,634 filed Mar. 5, 2004 in the names of Dmitri Iazikov, Thomas W. Mossberg, and Christoph M. Greiner (now U.S. Pat. No. 6,985,656 issued Jan. 10, 2006);

Application Ser. No. 10/740,194 filed Dec. 17, 2003 in the names of Dmitri Iazikov, Thomas W. Mossberg, and Christoph M. Greiner (now U.S. Pat. No. 7,224,855 issued May 29, 2007);

Application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004);

Application Ser. No. 10/602,327 filed Jun. 23, 2003 in the name of Thomas W. Mossberg (now U.S. Pat. No. 6,859,318 issued Feb. 22, 2005);

Application Ser. No. 10/229,444 filed Aug. 27, 2002 in the names of Thomas W. Mossberg and Christoph M. Greiner (now U.S. Pat. No. 6,678,429 issued Jan. 13, 2004);

Application Ser. No. 09/843,597 filed Apr. 26, 2001 in the name of Thomas W. Mossberg (now U.S. Pat. No. 6,965,464 issued Nov. 15, 2005);

Application Ser. No. 09/811,081 filed Mar. 16, 2001 in the name of Thomas W. Mossberg (now U.S. Pat. No. 6,879,441 issued Apr. 12, 2005).

Application Ser. No. 11/376,714 is hereby incorporated by reference as if fully set forth herein. Application Ser. No. 11/376,714 and many of the other references listed above are indicative of the state of the art for forming diffractive elements. Some of these cited references describe diffractive elements formed in a one- or two-dimensional optical waveguide, wherein the input or output optical signal propagates in the waveguide. Some of these cited references describe diffractive elements forming surface gratings, wherein both input and output optical signals propagate as diffraction-guided optical beams. For one or more of the references cited hereinabove, it may be the case that the devices, structures, embodiments, implementations, adaptations, procedures, or techniques disclosed therein may be employed, within the scope of the present disclosure or appended claims, for optical encoding of data.

SUMMARY

An optical data storage medium comprises an optical medium with multiple data marks. Each data mark is arranged for modifying a portion of an optical reading beam incident thereon. At least one of the data marks is a delocalized data mark comprising a set of multiple diffractive elements collectively arranged for modifying a portion of the optical reading beam incident thereon. A method for recording data on an optical data storage medium comprises forming on or in the optical medium multiple data marks encoding the recorded data, including the at least one delocalized data mark. A method for reading an optical data storage medium comprises: successively illuminating with the optical reading beam the multiple data marks; sensing variations among the respective portions of the optical reading beam modified by the multiple data marks; and decoding from the sensed variations data encoded by the multiple data marks.

Objects and advantages pertaining to optical encoding of data using distributed diffractive structures may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

Oval-like structures that may appear in various of the Figure showing diffractive element sets are artifacts of the printing/display method, and are not part of the depicted diffractive element set.

DETAILED DESCRIPTION OF EMBODIMENTS

Figure 2A:
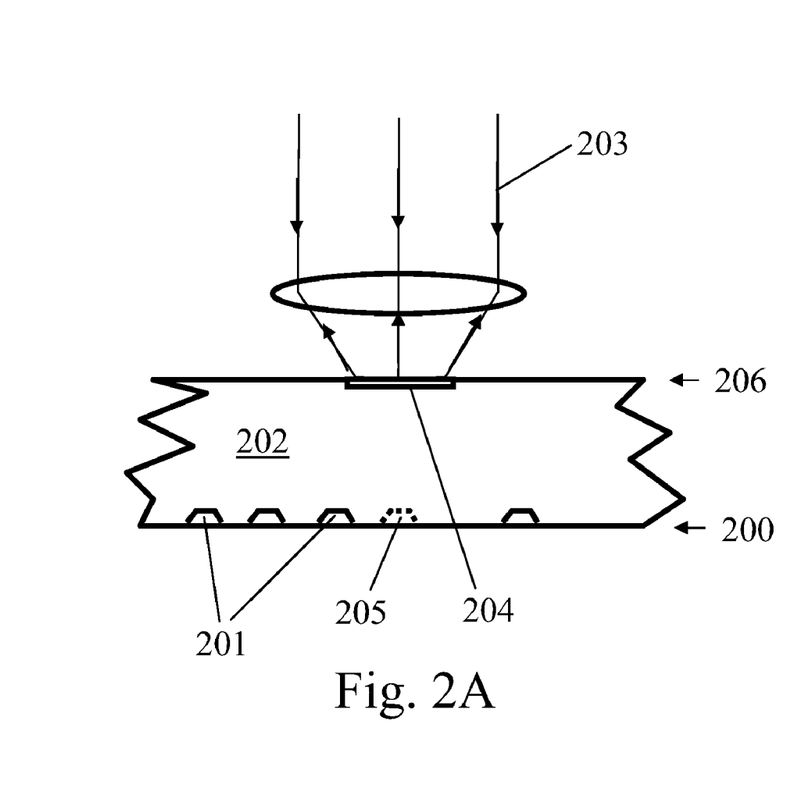
FIGS. 2A and 2B are schematic side and top views, respectively, of data marks on an optical data storage medium. Circular patterns appearing among the diffractive elements in FIG. 2B are artifacts of the printing method.

FIG. 2A illustrates schematically one exemplary embodiment of an optical medium with non-localized encoding of data using a distributed diffractive structure. An optical disc is shown having a data layer 200 with standard localized data marks 201 on a flat surface of the disc, the disc comprising a substantially transparent protective layer 202. An additional protective layer (not necessarily transparent; not shown) may be provided, if needed or desired, with data layer 200 between transparent protective layer 202 and the additional protective layer. Also shown is a distributed diffractive structure formed on a flat surface of the disc opposite the data layer 200 on the surface of transparent protective layer 202 and comprising a set of diffractive elements 204. The set of diffractive elements 204 may be referred to as delocalized data mark 204, and may be arranged to interact with a reading-laser beam 203 in a manner equivalent to that of a virtual localized data mark 205 of data layer 200 (but which is not a physical mark on the data layer 200). The diffractive structure 204 in this example is part of a second data layer 206, is formed on the surface of the transparent protection layer 202, and back-reflects the reading-laser beam so as to mimic a beam back-reflected from an actual localized data mark at the position of virtual data mark 205 (even though no localized mark is present at that location).

Figure 2B:
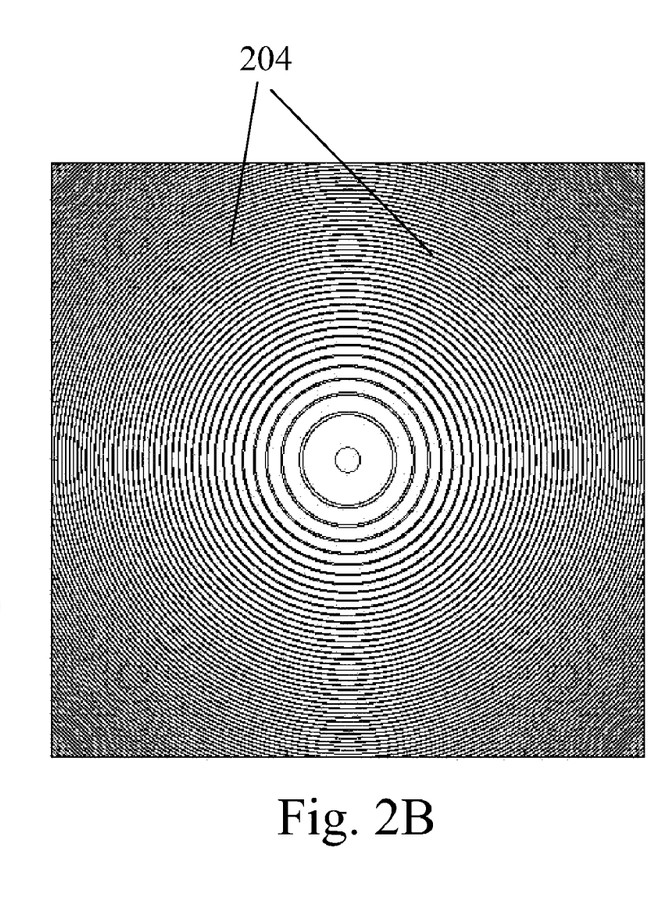

An example of a suitable distributed diffractive structure 204 is schematically shown in FIG. 2B. The pattern of FIG. 2B may be derived from computed interference between a simulated downward directed reading laser beam and a simulated back-reflected signal beam defined to couple into a receive channel of the disc reader. The pattern may be calculated from the interference between the two simulated beams at the position of the surface of the transparent layer 202. The distributed diffractive structure 204 may alternatively be positioned elsewhere, for example at an intermediate interfacial layer within a multilayered transparent layer 202, in which case the interference pattern should be computed at the appropriate location. This may be desirable for reducing misreading or non-reading of the delocalized encoded data due to scratches, dust, or other imperfections or irregularities on the surface of layer 202, or for making unauthorized reproduction of the distributed diffractive structure 204.

In one example, the diffractive element set 204 of FIG. 2B may be translated into a pattern of trenches formed on the top of or at an interfacial surface within the transparent layer 202. The phase difference between light back reflected from trench floors versus untrenched areas may optimally be of order $\pi$ radians; other phase difference may be employed for achieving desired back-reflection behavior. The exemplary pattern of FIG. 2B comprises a series of substantially concentric near circles exhibiting increasing radial density with increasing radius. (The smaller circular patterns appearing among the diffractive elements are artifacts of the rendering/printing methods used to produce the figure.) For optimizing overall reflectivity of the delocalized data mark, the trenches represented by each ring of the pattern (the diffractive elements 204, which may also be referred to as diffraction elements, diffractive contours, or diffractive lines), will optimally collectively cover about half of the surficial area of the delocalized data mark. Overall reflectivity of the delocalized data mark (i.e. diffractive element set 204) may be enhanced if needed or desired by providing a reflective dielectric or metallic coating over the diffractive elements.

Figure 2C:
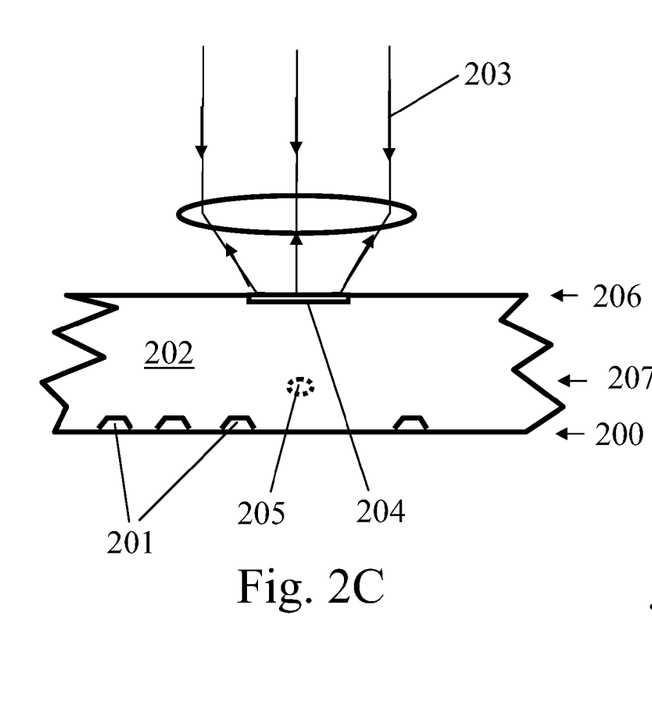
FIG. 2C is a schematic side view of data marks on another optical data storage medium.

The back diffracted light from the distributed diffractive structure 204 (i.e. the delocalized data mark) of data layer 206 may be employed to produce detected back-reflected reading laser power level fluctuations that may be interpreted by the disc reader decoding hardware or software as data bits encoded in the usual way with localized data marks 201. Distributed diffractive structures 204 may thus provide an additional functional data layer 206; the disc reader may react as if a data bit were encoded as the localized virtual data mark 205 in data layer 200 even though the physical back-reflecting mechanism is a delocalized data mark 204 in data layer 206 at a different surficial or interfacial layer. A given disc may include both data layers 200 and 206, or may include only data layer 206. In a modification of this arrangement shown in FIG. 2C, delocalized data marks 204 may be arranged so that the corresponding virtual data marks 205 are not located in data layer 200, but are located at a differing depth within the disc to form a virtual data layer 207. Reading of data encoded in this displaced virtual data layer 207 would require, e.g., shifting of the focal plane of the reading laser to the depth of layer 207. This may be readily accomplished, for example, by inserting a transparent plate having suitable index and thickness into converging beam path of the reading laser.

Localized data marks 201 and delocalized data marks 204 have been described as modifying the intensity of a back-reflected portion of reading-laser beam 203, with the read data encoded in the detected intensity fluctuations. Other implementations of localized data marks 201 and delocalized data marks 204 may be employed which reflect, refract, redirect, attenuate, or otherwise modify at least a portion of reading-laser beam 203, with the read data encoded in the detected fluctuations of the portion of the reading-laser beam thus modified.

Figure 3:
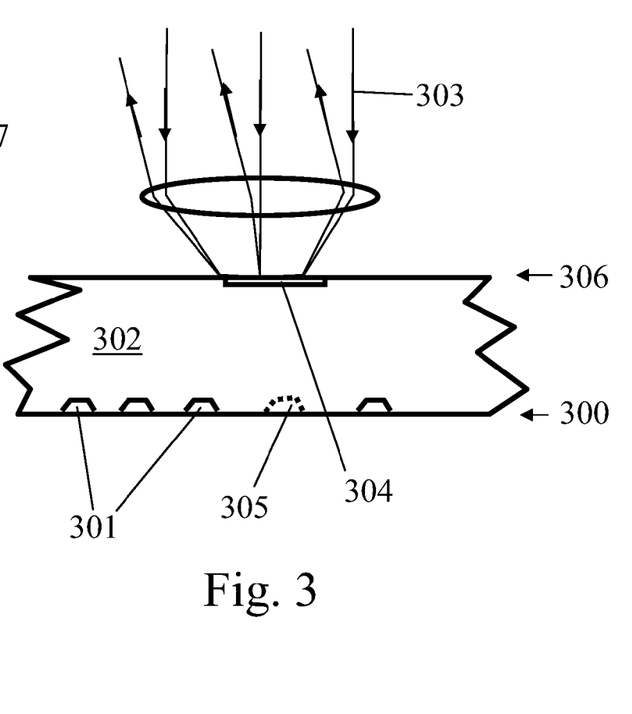
FIG. 3 is a schematic side view of data marks on an optical data storage medium.

In contrast to a localized data mark 301 in data layer 300 (FIG. 3), a delocalized 11 data mark 304 comprising diffractive elements is relatively larger in area, and may be as large as the reading laser beam at the surface or interfacial layer 306 where the delocalized mark 304 is recorded. As a result, the back-reflected portion of reading laser beam 303 is typically generated over a longer temporal duration as the reading laser passes over the area of delocalized data mark 304. However, the back-reflected signal from delocalized mark 304 is swept in output direction as the reading laser is incident on different portions of the area of data mark 304. In FIG. 3, the back-reflected signal 307 from distributed diffractive structure 303 arises from off-center illumination by reading beam 303, and is shown propagating in a different direction from the reading laser beam. Spatial filtering of the back reflected signal 307 may be employed for filtering out back-reflected signal propagating back into the reader at an angle other than that of the reading beam 303. For diffraction-limited beams and spatial filtering, a displacement of the reading laser beam 303 across the distributed diffractive structure 304 by an amount comparable to the size of localized data marks 301 (or virtual data mark 305) of the data layer 300 enables adequate signal differentiation.

Figure 4A:
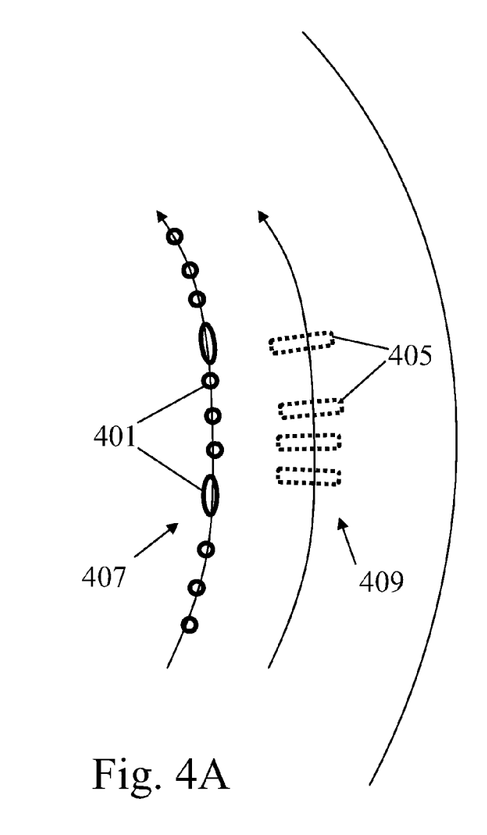
FIGS. 4A, 4B, and 4C are schematic top, side, and enlarged top views, respectively, of data marks on an optical data storage medium.
Figure 4B:
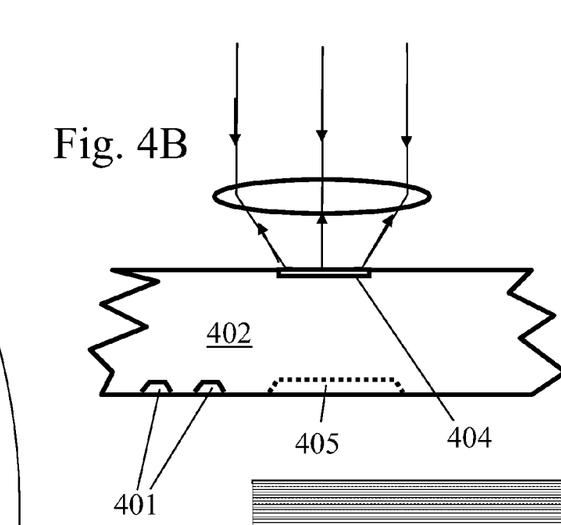
Figure 4C:
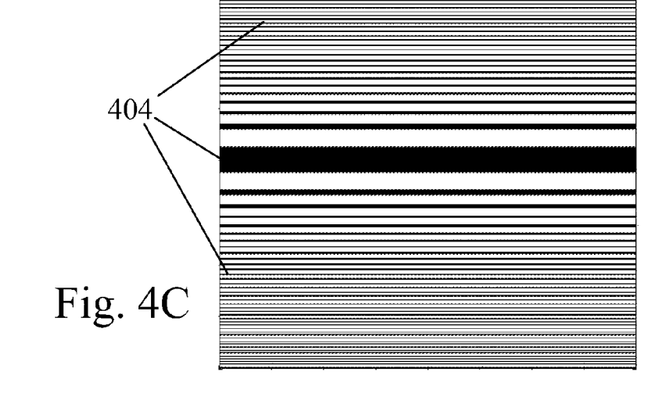

A focused-spot-laser-based disc writer or burner is typically designed to generate localized marks of particular character on a disc's data layer, and the form of these marks typically resembles dots or dashes extending along the scanning or reading direction on the disc. A virtual data mark 405 can be generated by a distributed diffractive structure 404 (i.e. a delocalized data mark) having non-standard properties or spatial shape or extent. In the schematic illustrations of FIGS. 4A and 4B, a disc is shown with a standard track 407 of localized data marks 401, and a non-standard track 409 of radially-oriented delocalized data marks 404 (i.e. extending across the scanning or reading direction on the disc). Generation of track 409 having radially oriented localized data marks using standard laser-based disc copying means may be problematic. A distributed diffractive structure 404 impressed on a top or interfacial surface of the transparent protective layer 402 may readily produce radially oriented virtual data marks 405. An exemplary distributed diffractive structure 404 resulting in a radially oriented virtual data mark 405 is shown schematically in FIG. 4C. Radially extended data marks (localized, delocalized, or virtual) may provide certain advantages from a security perspective. Such data marks may be formed with a radial extent large enough to allow the read head of a disc reader to read the data without tracking, and this capability may be exploited for providing security against disc copying with a laser-based disc writer. If a disc is manufactured with radially-extended delocalized data marks, the data thus encoded may be read without tracking as a test of disc authenticity or legitimacy. While the data encoded in the radially-extending marks might be read by a standard reader, a standard focused-spot-laser-based writer would typically generate tracked, radially-localized data marks in a copying process. Attempted non-tracked reading of a disc thus copied would typically fail since the untracked read head would have only a small probability of passing over each laser-written localized data mark.

Diffractive element sets (i.e. delocalized data marks) corresponding to point-like or extended virtual data marks may be stamped, molded, embossed, etched, or otherwise formed on a top or interfacial surface of a transparent protective layer of an optical disc. Such delocalized data marks may be used to encode data that may be reproduced (typically point-like virtual data marks), or that may not be readily reproduced (typically extended, e.g. radial, virtual data marks), by a focused-spot-laser-based disc writer. A point-like virtual data mark may be characterized as a localized mark of a size, in a dimension perpendicular to a scanning or reading direction on the disc, similar to that of a focused spot of a reading laser beam in a typical disc reader (i.e. marks of micron-scale width). An extended virtual data mark may be characterized as a localized mark many times the size of the focused spot of the reading laser in the dimension perpendicular to the scanning or reading direction on the disc (i.e. marks many microns wide).

If virtual data marks are to be placed in close proximity so that the corresponding distributed diffractive structures overlap, the diffractive elements may be arranged according to the teachings of various of the references cited hereinabove. For example, the diffractive elements depicted in FIG. 2B or 4C (represented by the dark curves or dark lines) may be formed as dashed, dotted, or otherwise pixilated, segmented, or discontinuous curvilinear elements. In other words, instead of writing the diffractive elements continuously as shown, they may be only partially written. If only twenty percent of each diffractive element is formed, for example, then approximately 5 different distributed diffractive structures may be overlaid without substantial interference or distortion. Some care may be taken in the design stage to ensure that the segments formed that correspond to diffractive elements of different overlaid diffractive structures do not spatially coincide or overlap. A variety of arrangements and techniques for overlapping multiple diffractive structures may be implemented as described in various of the references cited hereinabove.

As disclosed in various of the references cited hereinabove, the curvilinear shape of the diffractive element contours may be determined by a variety of standard optical imaging system design tools or via calculated interference of simulated design optical beams. Simple curves (e.g. conic sections) may be employed as approximations of the fully optimized contours. A variety of suitable arrangements and adaptations for distributed diffractive structures are described in the cited references, and may be employed for implementing delocalized data marks according to the present disclosure.

In one example, design of distributed diffractive structures resulting in specific virtual data marks may be formulated as follows: At the wavelength of interest (presumably the reading laser wavelength), a mathematically-simulated design input optical field exhibiting spatial and spectral properties of the desired input optical signal beam (the reading beam) is computationally interfered with a mathematically-simulated design output optical field exhibiting spatial and spectral properties of the desired output optical beam (the detected beam). Diffractive elements spanning the region over which the simulated interference pattern exists diffractively route part of the input beam into the output beam. The input and output beams are stipulated to pass through schematic ports on entry or exit. The ports may be defined by spatial location, positional wavefront, beam direction, etc. "Mathematically-simulated" may denote an optical signal simulated analytically or numerically, while "computation" may denote analytical computation or numerical computation. The input and output fields (denoted by subscripts 1 and 2, respectively) may be given by the real part of:

$$E_{1,2}(\bar{x},t) = S_{1,2}(\bar{x})T_{1,2}\left(t - \frac{\partial \bar{k}_{1,2}(\bar{x})}{\partial \omega_{1,2}} \cdot \bar{x}\right)\exp i(\omega_{1,2}t - \bar{k}_{1,2}(\bar{x}) \cdot \bar{x}) \quad (1)$$

where $S_i$ is a spatial mode field amplitude distribution, $T_i$ is a temporal envelope, $\omega_i$ is the optical frequency, $k_i$ is the modal wavevector spatial distribution, and $\partial k_i/\partial \omega_i$ is the inverse of the group velocity. Note that $S_i$ and $k_i$ are related in a manner that satisfies Maxwell's equations, while $\omega_i$, $k_i$, and $\partial k_i/\partial \omega_i$ are related by the dispersion properties of the medium in which the signals propagate. In general the product of $S_i$ and $T_i$ may be normalized in any suitable way. If the optical signals are continuous-wave (cw), then $T_i$ is constant for both signals (assume $T_i$=1). In a first computational step for such continuous-wave optical signals with $\omega_1 \cong \omega_2$, an optical interference pattern between the two optical signal fields is calculated as:

$$I(\bar{x},t) = (E_1(\bar{x},t) + E_2(\bar{x},t)) + (E_1(\bar{x},t) + E_2(\bar{x},t))^* \quad (2)$$

$$= |S_1(\bar{x})|^2 + |S_2(\bar{x})|^2 + 2|S_1(\bar{x})||S_2(\bar{x})|\cos(\Delta\bar{k}(\bar{x}) \cdot \bar{x} + \varphi(\bar{x}))$$

where $\Delta k \equiv k_2 - k_1$ and $\phi \equiv Arg(S_1 S_2^*)$ (all functions of position). Designs for various types of diffractive element sets (i.e., various types of delocalized data marks or corresponding virtual data marks) may be derived from the interference pattern in several ways. In many examples (but not all), the first two terms of Eq. 2 are discarded, and a diffractive element design is derived from the third term of Eq. 2 (referred to as the interferogram, which physically spans the diffractive transformation region).

For the specific case of two interfering fields, the interferogram may be decomposed into three factors: a first magnitude factor $|S_1(x)|$, which spatially varies in proportion to the magnitude of the simulated design input optical field; a second magnitude factor $|S_2(x)|$, which spatially varies in proportion to the magnitude of the simulated design output optical field; and a phase factor $\cos(\Delta k \cdot x + \phi)$, which depends on the phase difference between the simulated design input and output optical fields and which typically varies spatially on a relatively rapid scale. The product $|S_1(x)||S_2(x)|$ may be referred to as the interferogram intensity function, while $\cos(\Delta k \cdot x + \phi)$ may be referred to as the interferogram phase function. In many instances only the interferogram phase function is employed for designing a diffractive element set, while in other instances the interferogram intensity function or one of the individual magnitude factors may be employed as well. It is understood that the mathematical expression given for simulated design input and output fields is only one possible expression for such fields and others may be used as well. In all cases, an interference pattern may be calculated, which may be decomposed into terms analogous to those given above. Any suitable mathematical expressions for simulated design optical beams or the resulting interference pattern or interferogram shall fall within the scope of the present disclosure. In the calculation of surficial diffractive structures, it is the intersection of the full three-dimensional interference pattern 110 (in the case that the input and output beams are diffraction-guided beams) with the surface of substrate 120 that forms the basis of design.

Optical fields used for interference pattern generation may be realizable by physical sources, however, the present disclosure also encompasses use of simulated design fields that are merely theoretical and may or may not be conveniently obtainable with actual light sources or in the waveguide geometries of interest. Moreover, when using actual optical signals to generate an interference pattern, it is not possible to drop the first two terms of Eq. 2 to isolate the interferogram, as is possible when using simulated optical signals. Exemplary embodiments shown and described herein may include the use of only two simulated design fields to generate the interference pattern. More generally, three or more simulated optical fields maybe employed for forming an interference pattern and for designing diffractive element sets, and such use of three or more simulated design optical fields shall fall within the scope of the present disclosure or appended claims. Such multi-beam-interference-designed distributed optical structures may be useful for coupling multiple input signals to a single output beam, a single input signal to multiple output beams (i.e. an optical splitter), or multiple inputs each to one or more outputs.

A design for a diffractive element set may be derived from the interferogram as it intersects the design surface of interest. A diffractive element set on a substrate (flat, as is most lithographically convenient, or curved) may be regarded as a two-dimensional spatial distribution of optical-field reflection strength, which may also be referred to as a diffractive strength distribution. The diffractive strength distribution is derived computationally from the interferogram by a well-defined mapping of the value of the interferogram (either as originally generated from the simulated fields or suitably modified thereafter) at a given position to an optical field reflection coefficient value at that position. The diffractive strength distribution may be realized physically in various ways, many of which are described in the various references cited hereinabove. Typically, a diffractive element set comprising the diffractive strength distribution is fabricated in the form of a two-dimensional surface relief structure. Such a distribution may be fabricated in various ways, e.g. by etching, molding, embossing, stamping, or otherwise forming suitably shaped trenches, which may or may not be coated with a reflective material such as a single layer of metal or dielectric. The surface relief structure may be formed on the top surface of the transparent protective layer of the disc, or may be formed at an interfacial surface within the protective layer (i.e. the surface relief structure may be overcoated with a dielectric layer sufficiently thick to fill or partially fill surface features resulting in a robust nearly flat final surface). Phase extremes on transmission or reflection may be on the order of $\pi$ to $2\pi$ or may span any other suitable range. In the reflective case, the device may also be overcoated with a protective layer after reflection enhancing layer(s) are applied or even if no enhancing layer is applied and back diffracted signal strength is tied to the index differential between the substrate material and the overcoating material. It may be desirable in some cases to fill diffractive relief structures with a material such as a polymer similar to that used elsewhere in the transparent protective layer of the disc so that disassembly to analyze the diffractive pattern encoded is difficult or intractable.

When designing a distributed diffractive structure corresponding to an extended virtual data mark (as in FIG. 4C for example), a one-dimensional slice of a diffractive structure corresponding to a point-like virtual data (as in FIG. 2B) may be employed as a template, which is then translated to form a two-dimensional pattern for an extended virtual data mark. Specifically, translation of a one-dimensional cross-sectional slice through the diffractive element pattern normal to the cut direction creates a diffractive element pattern for an extended virtual data mark. A distributed diffractive structure so designed functions in a manner analogous to a cylindrical lens.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical data storage medium, comprising an optical medium with multiple data marks, each data mark being arranged for modifying a portion of an optical reading beam incident thereon, wherein at least one of the data marks is a delocalized data mark comprising a set of multiple diffractive elements collectively arranged for modifying a portion of the optical reading beam incident thereon.

2. The optical data storage medium of claim 1, wherein the optical medium comprises a flattened disc with a data layer that includes the at least one delocalized data mark, and the data layer is formed on one flat surface of the disc or in the interior of the disc.

3. The optical data storage medium of claim 1, wherein:
    the optical medium comprises a flattened disc with two data layers, the two data layers being arranged at differing depths along an axial direction within the disc;
    the first data layer includes at least one localized data mark; and
    the second data layer includes the at least one delocalized data mark.

4. The optical data storage medium of claim 3, wherein the first data layer and the second data layer are formed on opposing first and second flat surfaces of the disc.

5. The optical data storage medium of claim 3, wherein the first data layer is formed on one flat surface of the disc, and the second data layer is formed in the interior of the disc.

6. The optical data storage medium of claim 3, wherein the first data layer or the second data layer includes a reflective layer.

7. The optical data storage medium of claim 1, wherein the at least one delocalized data mark is arranged so as to modify a portion of the optical reading beam incident thereon so that the corresponding modified portion of the optical reading beam appears to be modified by a virtual localized data mark at a differing position in the optical medium.

8. The optical data storage medium of claim 7, wherein the virtual localized data mark is a point-like data mark.

9. The optical data storage medium of claim 7, wherein the virtual localized data mark is an extended data mark.

10. The data storage medium of claim 1, wherein the diffractive elements of the delocalized data mark are arranged according to an optical interference pattern computed between a simulated incident optical reading beam and a simulated modified portion of the simulated optical reading beam.

11. The data storage medium of claim 1, wherein the diffractive elements of multiple delocalized data marks at least partly spatially overlap, and the diffractive elements of each delocalized data mark are only partially formed so as to enable each of the multiple delocalized data marks to modify a corresponding portion of the incident optical reading beam substantially independently of the other overlapping delocalized data marks.

12. A method for reading an optical data storage medium, comprising:
    successively illuminating with an optical reading beam multiple data marks on the optical medium, each data mark being arranged for modifying a portion of the incident optical reading beam;
    sensing variations among the respective portions of the optical reading beam modified by the multiple data marks; and
    decoding from the sensed variations data encoded by the multiple data marks,
    wherein at least one of the data marks is a delocalized data mark comprising a set of multiple diffractive elements collectively arranged for modifying a portion of the optical reading beam incident thereon.

13. The optical data reading method of claim 12, wherein the optical medium comprises a flattened disc with a data layer that includes the at least one delocalized data mark, and the data layer is formed on one flat surface of the disc or in the interior of the disc.

14. The optical data reading method of claim 12, wherein:
    the optical medium comprises a flattened disc with two data layers, the two data layers being arranged at differing depths along an axial direction within the disc;
    the first data layer includes at least one localized data mark; and
    the second data layer includes the at least one delocalized data mark.

15. The optical data reading method of claim 14, wherein the first data layer and the second data layer are formed on opposing first and second flat surfaces of the disc.

16. The optical data reading method of claim 14, wherein the first data layer is formed on one flat surface of the disc, and the second data layer is formed in the interior of the disc.

17. The optical data reading method of claim 14, wherein the first data layer or the second data layer includes a reflective layer.

18. The optical data reading method of claim 12, wherein the at least one delocalized data mark is arranged so as to modify a portion of the optical reading beam incident thereon so that the corresponding modified portion of the optical reading beam appears to be modified by a virtual localized data mark at a differing position in the optical medium.

19. The optical data reading method of claim 18, wherein the virtual localized data mark is a point-like data mark.

20. The optical data reading method of claim 18, wherein the virtual localized data mark is an extended data mark.

21. The optical data reading method of claim 12, wherein the diffractive elements of the delocalized data mark are arranged according to an optical interference pattern computed between a simulated incident optical reading beam and a simulated modified portion of the simulated optical reading beam.

22. The optical data reading method of claim 12, wherein the diffractive elements of multiple delocalized data marks at least partly spatially overlap, and the diffractive elements of each delocalized data mark are only partially formed so as to enable each of the multiple delocalized data marks to modify a corresponding portion of the incident optical reading beam substantially independently of the other overlapping delocalized data marks.

23. A method for recording data on an optical data storage medium, comprising forming on or in the optical medium multiple data marks encoding the recorded data, each data mark being arranged for modifying a portion of an optical reading beam incident thereon, wherein at least one of the data marks is a delocalized data mark comprising a set of multiple diffractive elements collectively arranged for modifying a portion of the optical reading beam incident thereon.

24. The optical data recording method of claim 23, wherein the optical medium comprises a flattened disc with a data layer that includes the at least one delocalized data mark, and the data layer is formed on one flat surface of the disc or in the interior of the disc.

25. The optical data recording method of claim 23, wherein:
    the optical medium comprises a flattened disc with two data layers, the two data layers being arranged at differing depths along an axial direction within the disc;
    the first data layer includes at least one localized data mark; and
    the second data layer includes the at least one delocalized data mark.

26. The optical data recording method of claim 25, wherein the first data layer and the second data layer are formed on opposing first and second flat surfaces of the disc.

27. The optical data recording method of claim 25, wherein the first data layer is formed on one flat surface of the disc, and the second data layer is formed in the interior of the disc.

28. The optical data recording method of claim 25, wherein the first data layer or the second data layer includes a reflective layer.

29. The optical data recording method of claim 23, further comprising arranging the at least one delocalized data mark so as to modify a portion of the optical reading beam incident thereon so that the corresponding modified portion of the optical reading beam appears to be modified by a virtual localized data mark at a differing position in the optical medium.

30. The optical data recording method of claim 29, wherein the virtual localized data mark is a point-like data mark.

31. The optical data recording method of claim 29, wherein the virtual localized data mark is an extended data mark.

32. The optical data recording method of claim 23, further comprising arranging the diffractive elements of the delocalized data mark according to an optical interference pattern computed between a simulated incident optical reading beam and a simulated modified portion of the simulated optical reading beam.

33. The optical data recording method of claim 23, wherein the diffractive elements of multiple delocalized data marks at least partly spatially overlap, and the diffractive elements of each delocalized data mark are only partially formed so as to enable each of the multiple delocalized data marks to modify a corresponding portion of the incident optical reading beam substantially independently of the other overlapping delocalized data marks.

* * * * *

UNITED STATES PATENT AND TRADEMARK OFFICE
CERTIFICATE OF CORRECTION

PATENT NO. : 7,643,400 B1
APPLICATION NO. : 11/277423
DATED : January 5, 2010
INVENTOR(S) : Iazikov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-first Day of December, 2010

David J. Kappos
*Director of the United States Patent and Trademark Office*